(12) United States Patent
Fan

(10) Patent No.: US 9,255,622 B2
(45) Date of Patent: Feb. 9, 2016

(54) BUFFERING DEVICE

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Yong-Chang Fan, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 103 days.

(21) Appl. No.: 14/079,638

(22) Filed: Nov. 14, 2013

(65) Prior Publication Data

US 2014/0182982 A1    Jul. 3, 2014

(30) Foreign Application Priority Data

Dec. 29, 2012   (CN) .......................... 2012 1 0589102

(51) Int. Cl.
*F16F 9/516* (2006.01)
*F16F 9/02* (2006.01)

(52) U.S. Cl.
CPC ............... *F16F 9/516* (2013.01); *F16F 9/0218* (2013.01)

(58) Field of Classification Search
CPC .......... G06F 3/017; F16F 9/516; F16F 9/0218
USPC ................................... 267/273; 188/304, 320
See application file for complete search history.

(56) References Cited

U.S. PATENT DOCUMENTS 2,788,092 A * 4/1957 Whisler, Jr. ................... 188/320
2002/0088677 A1 * 7/2002 Fitz et al. ...................... 188/304

FOREIGN PATENT DOCUMENTS

WO      WO 2010012766 A1 *   2/2010

* cited by examiner

*Primary Examiner* — Melanie Torres Williams
(74) *Attorney, Agent, or Firm* — Novak Druce Connolly Bove + Quigg LLP

(57) ABSTRACT

A buffering device includes a cylindrical casing and a piston module movably mounted in the cylindrical casing. The cylindrical casing includes a base plate and a shielding piece pivotally attached to the base plate. An air inlet and an air outlet are defined in the base plate. A diameter of the air inlet is greater than that of the air outlet. When the piston module is moving towards the base plate, the shielding piece is rotated to a closed position to shield the air inlet by air pressure above the shielding piece. When the piston module is moving away from the base plate, the shielding piece is rotated to an open position to expose the air inlet by environmental air pressure.

14 Claims, 4 Drawing Sheets

BUFFERING DEVICE

BACKGROUND

1. Technical Field

The present disclosure relates to a buffering device.

2. Description of Related Art

A vending machine includes a cabinet and a door pivotably attached to the cabinet. A buffering device is attached to the door. When the door is rotating to a closed position, the buffering device provides resistance to slow down a rotation speed of the door. However, the buffering device includes resilient members which easily become invalid because of mechanical fatigue.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation. In the figures of the accompanying drawings in which like references indicate similar elements. It should be noted that references to "an" or "one" embodiment in this disclosure are not necessarily to the same embodiment, and such references mean "at least one."

Figure 1:
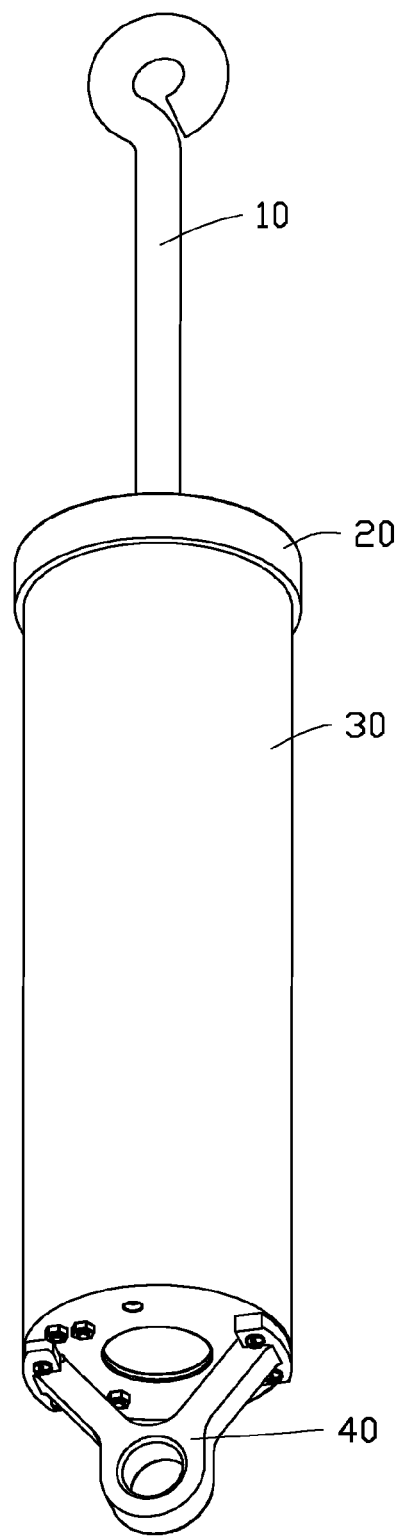
FIG. 1 is an assembled view of an embodiment of a buffering device.
Figure 2:
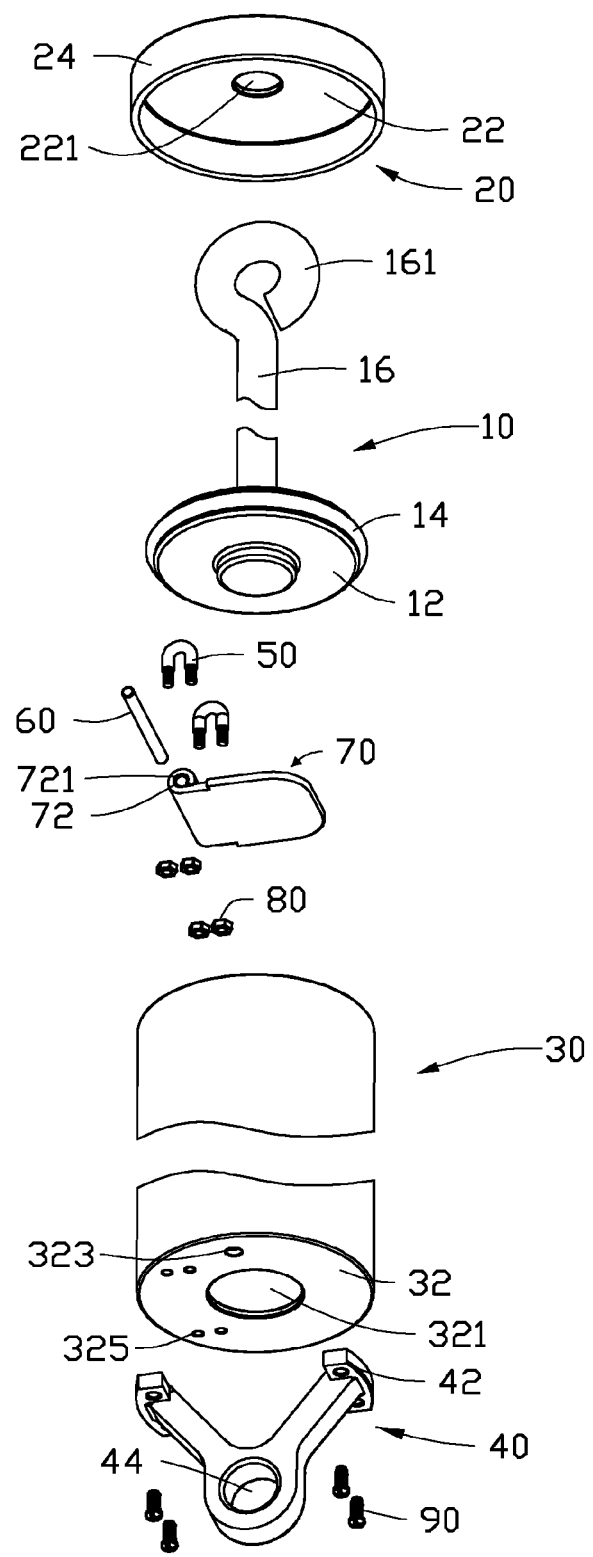
FIG. 2 is an exploded view of the buffering device of FIG. 1.
Figure 3:
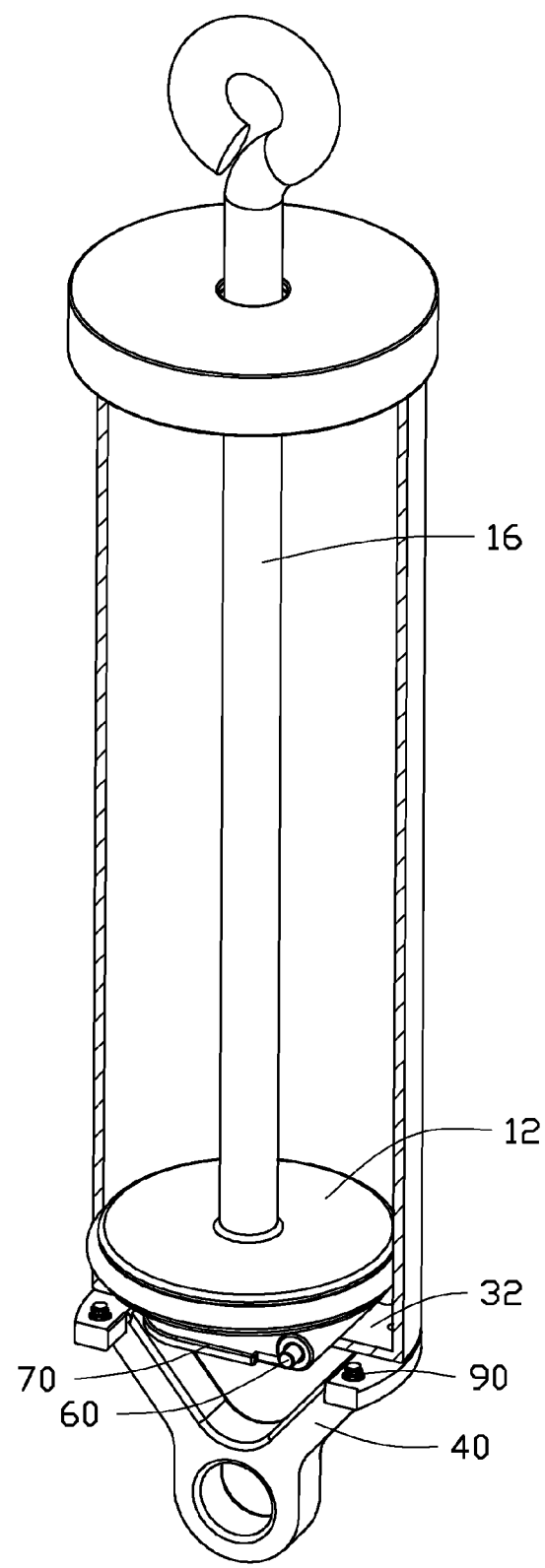
FIG. 3 illustrates an inner structure of the buffering device of FIG. 2, showing the buffering device in a first state.
Figure 4:
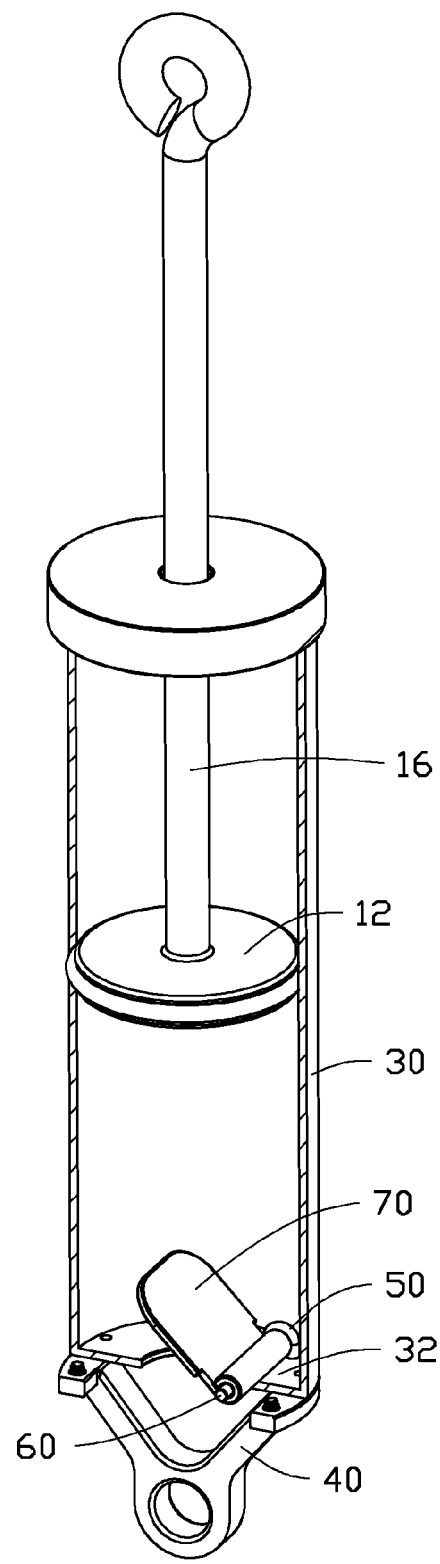
FIG. 4 is similar to FIG. 3, but showing the buffering device in a second state.

FIGS. 1 and 2 show an embodiment of a buffering device, which includes a piston module 10, a cover 20, a cylindrical casing 30, a mounting member 40, a pair of latching members 50, a pivot post 60, a shielding piece 70, two pairs of screw caps 80, and two pairs of fasteners 90.

The piston module 10 includes a valve 12, a piston ring 14 surrounding the valve 12, and a piston rod 16. The valve 12 is attached to a lower end of the piston rod 16. A curved mounting portion 161 extends from an upper end of the piston rod 16.

The cover 20 includes a circular plate 22 and a ring-shaped flange 24 extending substantially perpendicularly from the rim of the circular plate 22. A mounting hole 221 is defined in a central portion of the circular plate 22 for allowing the piston rod 16 to pass through. A diameter of the mounting hole 221 is substantially equal to the diameter of the piston rod 16.

The cylindrical casing 30 includes a base plate 32. An air inlet 321 is defined in a central portion of the base plate 32. Two pairs of mounting holes 325 are defined in the base plate 32. An air outlet 323 is defined in the base plate 32 near the air inlet 321. A diameter of the air inlet 321 is much greater than the diameter of the air outlet 323. An inner diameter of the ring-shaped flange 24 is substantially equal to an outer diameter of the cylindrical casing 30. A length of the piston rod 16 is greater than that of the cylindrical casing 30.

The mounting member 40 is substantially V-shaped. A mounting hole 44 is defined in a bottom portion of the mounting member 40. A pair of mounting tabs 42 is connected to a pair of distal ends of the mounting member 40.

Each latching member 50 has a U-shape and includes a pair of threaded ends. A distance between the pair of threaded ends is substantially equal to that between each pair of mounting holes 325.

The shielding piece 70 includes a rectangular main piece and a pivot mounting flange 72 extending from one short edge of the rectangular main piece. A pivot hole 721 is surrounded by the pivot mounting flange 72. A length of the pivot post 60 is greater than a width of the shielding piece 70 or a length of the pivot mounting flange 72. The width of the shielding piece 70 is greater than the diameter of the air inlet 321.

Referring to FIGS. 1 to 4, in assembly, the pivot post 60 extends through the pivot hole 721. Two ends of the pivot post 60 protrude from opposite sides of the pivot mounting flange 72. The pair of latching members 50 latches the two ends of the pivot post 60. The pair of threaded ends of each latching member 50 extends through one pair of mounting holes 325. One pair of screw caps 80 engages with the pair of threaded ends. The pivot post 60 is securely mounted on an inner side of the base plate 32 by the pair of latching members 50. The shielding piece 70 is pivotably mounted on the inner side of the base plate 32 by the pivot post 60 and capable of covering the air inlet 321. The piston rod 16 extends through the mounting hole 221. The curved mounting portion 161 is located above the cover 20. The valve 12 is attached to the lower end of the piston rod 16. The valve 12 is moved into the cylindrical casing 30. The cover 20 is attached to the cylindrical casing 30 for covering a top opening of the cylindrical casing 30. The ring-shaped flange 24 abuts against an outer surface of the cylindrical casing 30. The pair of mounting tabs 42 is secured to the base plate 32 by the two pairs of fasteners 90. The buffering device can be applied in a vending machine. The curved mounting portion 161 can be attached to a cabinet of the vending machine. The mounting member 40 can be attached to a door of the vending machine. The buffering device can slow down a door closing speed of the vending machine.

When the piston module 10 is at a first position (see FIG. 3), the valve 12 abuts against the shielding piece 70. The shielding piece 70 is at a closed position and fully covers the air inlet 321. When the piston module 10 is moved upwards from the first position, away from the base plate 32, the pressure above the shielding piece 70 is lower than the environmental pressure, causing the shielding piece 70 to rotate upwardly to an oblique position (see FIG. 4) thereby opening the air inlet 321. The piston module 10 suffers little resistance during moving upwards. Thus, a door open speed of the vending machine is not influenced by the buffering device.

When the piston module 10 is moved downwards towards the base plate 32, the pressure between the valve 12 and the shielding member 70 increases, causing the shielding piece 70 to rotate to the closed position, thereby blocking the air inlet 321 with the shielding piece 70. A small amount of air can flow out from the air outlet 323. When the piston module 10 is moving downward towards the base plate 32, there is a great resistance because the pressure between the valve 12 and base plate 32 increases. Thus, the moving speed of the piston module 10 is slow. The door closing speed of the vending machine is decreased by the buffering device.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. A buffering device, comprising:
a cylindrical casing comprising a base plate;
a shielding piece pivotally attached to the base plate; and
a piston module movably mounted in the cylindrical casing and capable of moving towards or moving away from the base plate;
wherein the shielding piece comprises a main piece, a pivot mounting flange extends from the main piece, and a pivot hole is surrounded pivot mounting flange; a pivot post extends through the pivot hole for pivotably mounting the shielding piece on the base plate; an air inlet and an air outlet are defined in the base plate; a diameter of the air inlet being greater than that of the air outlet; when the piston module is moving towards the base plate, pressure inside the cylindrical casing causes the shielding piece to rotate to a closed position, thereby blocking the air inlet; and when the piston module is moving away from the base plate, environmental pressure causes the shielding piece to rotate to an open position, thereby opening the air inlet.

2. The buffering device of claim 1, further comprising a pair of latching members, wherein two ends of the pivot post protrude from opposite sides of the pivot mounting flange and are latched by the pair of latching members.

3. The buffering device of claim 2, wherein each latching member has a U-shape, and a pair of mounting holes is defined in the base plate for mounting two ends of each latching member.

4. The buffering device of claim 3, wherein the air inlet has a circular shape, and a width of the shielding piece is greater than a diameter of the air inlet, but less than the diameter of the cylindrical casing.

5. The buffering device of claim 1, wherein the piston module comprises a piston rod, a valve attached to one end of the piston rod, and a curved mounting portion extending from another end of the piston rod; and a rim of the valve abuts against an inner surface of the cylindrical casing.

6. The buffering device of claim 5, further comprising a cover attached to the cylindrical casing for shielding an opening of the cylindrical casing, a mounting hole is defined in a central portion of the cover, and the piston rod extends through the mounting hole.

7. The buffering device of claim 6, wherein a diameter of the mounting hole is substantially equal to that of the piston rod.

8. A buffering device, comprising:
a cylindrical casing comprising a base plate;
a piston module, movably mounted in the cylindrical casing, and comprising a piston rod and a valve attached to the piston rod; and
a shielding piece pivotally attached to the base plate;
wherein the shielding piece comprises a main piece, a pivot mounting flange extends from the main piece, and a pivot hole is surrounded pivot mounting flange; a pivot post extends through the pivot hole for pivotably mounting the shielding piece on the base plate; an air inlet and an air outlet are defined in the base plate; a diameter of the air inlet is greater than that of the air outlet; when the valve is moving towards the base plate, pressure inside the cylindrical casing causes the shielding piece to rotate to a closed position, thereby blocking the air inlet; and when the piston module is moving away from the base plate, environmental pressure causes the shielding piece to rotate to an open position, thereby opening the air inlet.

9. The buffering device of claim 8, further comprising a pair of latching members, wherein two ends of the pivot post protrude from opposite sides of the pivot mounting flange and are latched by the pair of latching members.

10. The buffering device of claim 9, wherein each latching member has a U-shape, and a pair of mounting holes is defined in the base plate for mounting two ends of each latching member.

11. The buffering device of claim 10, wherein the air inlet has a circular shape, and a width of the shielding piece is greater than a diameter of the air inlet, but less than the diameter of the cylindrical casing.

12. The buffering device of claim 8, wherein the piston module the valve is attached to one end of the piston rod, and a curved mounting portion extending from another end of the piston rod; and a rim of the valve abuts against an inner surface of the cylindrical casing.

13. The buffering device of claim 12, further comprising a cover attached to the cylindrical casing for shielding an opening of the cylindrical casing, a mounting hole is defined in a central portion of the cover, and the piston rod extends through the mounting hole.

14. The buffering device of claim 13, wherein a diameter of the mounting hole is substantially equal to that of the piston rod.

* * * * *